United States Patent
Bottenbruch et al.

(10) Patent No.: US 6,505,154 B1
(45) Date of Patent: Jan. 7, 2003

(54) METHOD AND DEVICE FOR COMPARING ACOUSTIC INPUT SIGNALS FED INTO AN INPUT DEVICE WITH ACOUSTIC REFERENCE SIGNALS STORED IN A MEMORY

(75) Inventors: Hermann Bottenbruch, Ruhr (DE); Michael Mertens, Essen (DE)

(73) Assignee: Primasoft GmbH, Oberhausen (DE)

( * ) Notice: Subject to any disclaimer, the term of this patent is extended or adjusted under 35 U.S.C. 154(b) by 0 days.

(21) Appl. No.: 09/502,922

(22) Filed: Feb. 11, 2000

(30) Foreign Application Priority Data

Feb. 13, 1999 (DE) .......................................... 199 06 118

(51) Int. Cl.⁷ .............................................. G10L 11/04
(52) U.S. Cl. ...................... 704/236; 704/207; 704/209
(58) Field of Search ................................ 704/205, 206, 704/207, 208, 251, 231, 246, 247, 245, 209, 253, 236

(56) References Cited

U.S. PATENT DOCUMENTS 3,770,891 A * 11/1973 Kalfaian .................... 704/250
3,978,287 A * 8/1976 Fletcher et al. ............. 704/207
4,761,796 A * 8/1988 Dunn et al. ................. 375/133
5,127,056 A * 6/1992 Storaasli ................... 345/440.1
6,009,391 A * 12/1999 Asghar et al. .............. 704/222

FOREIGN PATENT DOCUMENTS

DE 2949582 6/1980 ............. G10L/1/02
DE 4111951 10/1992 ............. G10L/7/08

* cited by examiner

Primary Examiner—Richemond Dorvil
(74) Attorney, Agent, or Firm—Collard & Roe, P.C.

(57) ABSTRACT

The invention relates to a method and a device for comparing acoustic input signals fed into an input device (1) with acoustic reference signals stored in a memory (3). The first step in this case is to carry out a harmonic analysis of the input signals in a frequency analyzer (4) connected to the input device (1) and the memory (3), in order to produce a time-dependent Fourier spectrum. Thereafter, preselectable characteristics of the Fourier spectrum are determined as input signal coordinates for defining an n-dimensional input signal vector, where n is a number of the characteristics. Thereafter, the input signal vector is checked for correspondence of respectively corresponding coordinates within prescribed tolerances with at least one reference signal vector, which is defined in the same way and thereafter stored in the memory (3).

14 Claims, 3 Drawing Sheets

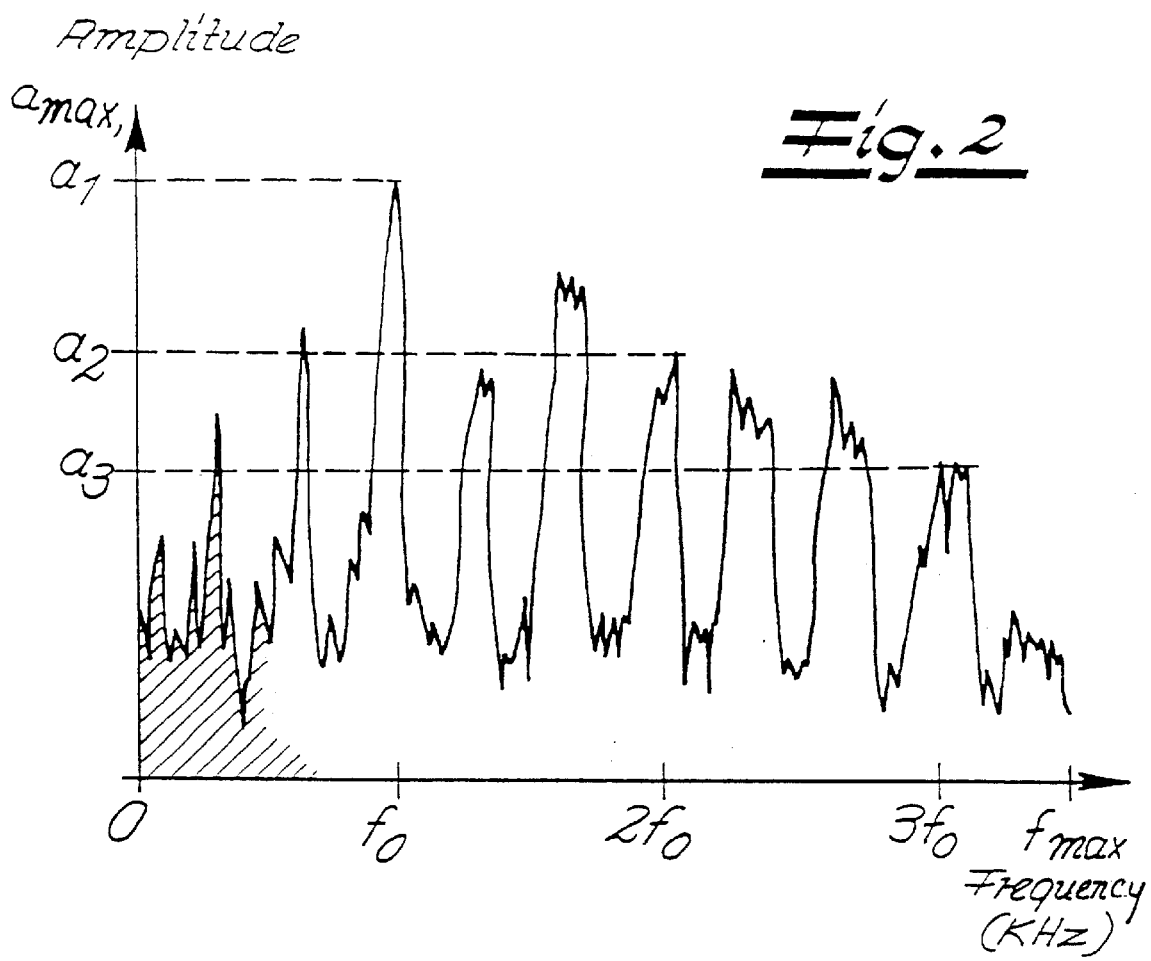
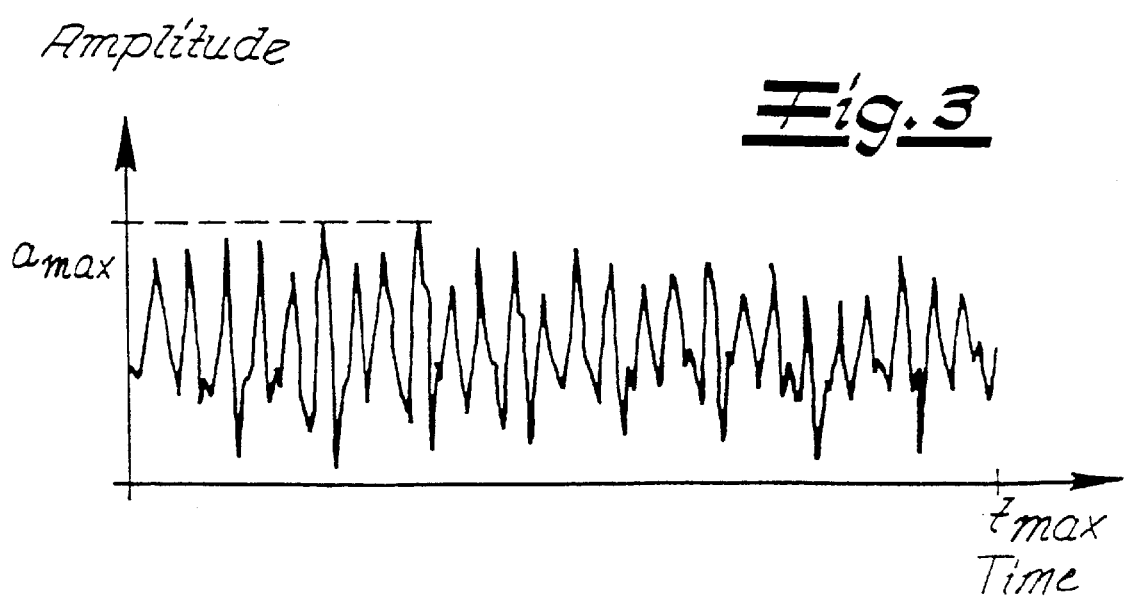

METHOD AND DEVICE FOR COMPARING ACOUSTIC INPUT SIGNALS FED INTO AN INPUT DEVICE WITH ACOUSTIC REFERENCE SIGNALS STORED IN A MEMORY

BACKGROUND OF THE INVENTION

1. Field of the Invention

The invention relates to a method for comparing at least one acoustic input signal fed into an input device with at least one further acoustic reference signal stored in a memory, in accordance with which

- a harmonic analysis of the input signal is carried out in order to produce a Fourier spectrum in a frequency analyzer connected to the input device and the memory, in accordance with which, furthermore,
- the Fourier spectrum is used to define an n-dimensional input signal vector with n input (signal) coordinates, and in accordance with which
- the input signal vector is checked for correspondence with at least one reference signal vector, which is defined in the same way and thereafter stored in the memory.

2. The Prior Art

In the case of a method of the configuration described at the beginning, a circuit arrangement for voice recognition is described which is equipped with an evaluation circuit for determining spectral feature vectors. In detail, an evaluation is made in this case of a time frame of a digital voice signal by means of a spectral analysis. The feature vectors obtained are compared with reference feature vectors. Before the comparison, the evaluation circuit performs a recursive high-pass filtering of the spectral feature vectors. The aim hereby is to enable recognition independent of speaker and to reduce the influence of interference on the result of recognition (compare DE 41 11 995 A1).

Moreover, there is a description in the prior art of a voice analysis system in which time segments of a voice signal are selected and a series of spectrum components of each voice segment are determined. These spectrum components form a discrete Fourier transform of samples of the voice signal. It is now possible to derive the position of significant peaks in each time segment from the series of relevant spectrum components.

Moreover, the procedure here is to select a value for the pitch. Intervals are defined around this initial value and a number of sequential integral multiples thereof. These intervals are regarded as openings in a mask, specifically in the sense that a frequency value which coincides with an opening is passed by the mask. Thus, in this sense the mask acts as a type of filter for frequency values. The aim in this way is for the described voice analysis system to be insensitive to interference signals and to require fewer calculations (compare DE 29 49 582 A1).

In a method known from practice, the general procedure is for an acoustic input signal, for example a tone, a tone sequence or else voice, to be compared with a stored acoustic reference signal and, in the event of correspondence, for a control device connected to the input device to be activated. This can relate to a door in connection with access control. Driving a machine is also conceivable. Corresponding attempts are also being made in the automotive sector in order, for example; to control individual functions by means of voice, for example to set flashers, switch lights on and off, etc.

The methods and devices previously considered are generally of very complex design and configuration, because in the end a complete analysis of the input signal is performed. The invention starts from this point.

The technical problem on which the invention is based is to develop such a method so as to achieve recognition with a simple means and quickly as well as with high accuracy. Moreover, an appropriately adapted device is to be specified.

In order to achieve this object, the invention proposes in the case of a method of the generic type and in accordance with a first alternative that the respective reference signal vector is flanked by a safety space or definition space, preferably adapted to the number of the reference signal vectors to be stored, and by an identity space, in which case the input signal vector is usually checked with the reference signal vector for correspondence of respectively corresponding coordinates within prescribed tolerances, and in which case, furthermore, the input signal vector is identified as being equal to the reference signal vector at least whenever it (the input signal vector) is situated inside the identity space and in which case respective reference signal vectors including the definition space have no overlap, that is to say the definition or safety spaces of all the reference signal vectors do not overlap one another. As a rule, recourse is made to at least two reference signal vectors. Otherwise, these reference signal vectors are, as mentioned, configured such that the intersections of respective reference signal vectors including the definition space is an empty set.

According to a preferred refinement, furthermore, the input signal vector to be compared with the reference signal vector is not detected outside the respective identity space. Alternatively, it is also possible to proceed so as additionally to define an option space which surrounds the identity space with a gray zone and serves, so to speak, as a collecting net for input signal vectors which cannot be assigned to an identity space of a reference signal vector.

The result in any case is that it is possible to compare the input signal vector and reference signal vector for correspondence in a way which is more accurate and simpler. The reason is that the safety space or definition space can be of variable configuration just like the identity space. Usually, the procedure here is that the reference signal vectors including the safety space exhibit no overlap. Since the configuration of the identity space is smaller than or equal to the safety space, input signal vectors can be interpreted as being equal or identical to the corresponding reference signal vector at least within the identity space, even if large tonal or voice deviations are to be noted in part.

Additionally, it is possible to add the described option space, which defines a type of gray zone around the identity space. This gray zone can be dimensioned such that an input signal vector can be assigned two (or more) reference signal vectors within this region—and only this region. This is generally not desirable, but offers advantages under some circumstances. In any case, owing to this property this gray zone acts, so to say, as a collecting net for input signal vectors which cannot be assigned to an identity space of a reference signal vector. This may be ascribed, inter alia, to the fact that input signal vectors are not detected as a rule outside the respective identity space.

According to a further proposal of the invention, which is of independent importance, in the case of a method of the generic type it is proposed that with the aid of an adjustable n-fold filter respectively preselectable characteristics of the Fourier spectrum are evaluated in the frequency analyzer and converted into the n input (signal) coordinates of the input signal vector. In this case, as well, respectively corresponding coordinates of the input signal vector and the reference signal vector are regularly checked here for correspondence within prescribed tolerances.

The prescribable characteristics can be the highest frequency, the maximum amplitude, the duration or relative gains of salient frequencies or the like of the input signal. Of course, a comparable statement also holds for the reference signal vector, which can likewise be defined via the above-mentioned characteristics of highest frequency, maximum amplitude, duration and relative gains of salient frequencies.

Of course, it is also possible to use additional coordinates based on other characteristics. It is conceivable here to determine the number of individual peaks in the Fourier spectrum. It would also be possible to determine a coordinate as the sum of the individual amplitudes, and thus as the amplitude integral over the frequency.

In the final analysis, this depends on the number of stored reference signal vectors with which the input signal vector must be compared: the trend is that more coordinates of the individual vectors are required the more reference signal vectors are present, and the closer the nature of their acoustic spacing. In other words, in the case of (a small number of) reference signal vectors of acoustically completely different formation, a relatively coarse grid with a low number of coordinates is generally sufficient. The closer (acoustically) the reference signal vectors, and thus also the input signal vectors, come to one another, the more coordinates then naturally have to be used for differentiation. It is to be taken into account in this case that both input signal vector and reference signal vector must in each case be of n-dimensional design so that the comparison can be carried out sensibly in an (n-fold) comparator used conventionally (where n is the number of the selected characteristics of the Fourier spectrum). According to a preferred embodiment, the invention further provides that the Fourier spectrum is recorded with a time constant adapted to the maximum length of the input signal, so that the Fourier spectrum can be exactly mapped onto the signal vector.

The abovementioned characteristics of the Fourier spectrum are determined and converted in the frequency analyzer with the aid of the adjustable n-fold filter. It is conceivable, for example, to evaluate the highest frequency, or else relative gains of salient frequencies in such a way as to use appropriately designed frequency filters. A similar statement holds for amplitude filters within which the maximum amplitude can be determined. In the simplest case, the duration of the signal can be measured via a timer or time filter. Recourse may be made to a summer as a filter, so to speak, for the amplitude integration over the frequency. The number of individual peaks can be detected with the aid of an amplitude filter in conjunction with a downstream counter. It is clear from the above that all the filters mentioned can be designed to be easily adjustable, with the result that the described possible selections of the characteristics of the Fourier spectrum can be represented in this way.

After evaluation of these properties with the aid of the adjustable filters in the frequency analyzer, it is possible to sum (and average) the found (measured) values over the time constant in one (or more) integrator(s). It is possible at their output to tap and further process corresponding values for the input coordinates of the input signal vector or reference coordinates of the reference signal vector.

In simple terms, this means that mathematically the Fourier spectrum of the input signal vector of the reference signal vector is mapped onto an n-dimensional input signal vector or reference signal vector. In order to define the reference signal vector, it is possible in this case for a specific reference signal (as input signal, so to say) to be repeatedly subjected to multiple harmonic analysis in order to determine a signal vector. The individual signal vectors detected and evaluated in this case can be averaged in order to determine the reference signal vector. This is performed in the simplest case in such a way that the individual reference coordinates of the respective signal vectors are added for the purpose of arithmetic averaging and divided by the number of the reference signal coordinates.

A preselectable number m of reference signal vectors with n reference coordinates can be stored in the memory by forming an m×n reference signal matrix there. Each point of this m×n reference signal matrix therefore corresponds to a specific reference coordinate which, for its part, has been derived from a characteristic of the Fourier spectrum.

The tolerances in the checking for correspondence (between the input signal vector and reference signal vector) are preferably formed as prescribed interval deviations of a respective reference coordinate of the reference signal vector by determining a respectively corresponding reference signal coordinates value range. In other words, the n-dimensional reference signal vector consists of individual reference coordinates which, for their part, span a respective value range, specifically the reference signal coordinates value range. In order to check the correspondence of the input signal vector and reference signal vector, the relative position of each input signal coordinate is determined by comparison with the associated reference signal coordinates value range. Correspondence obtains if the input signal coordinate is within this defined reference signal coordinates value range.

The invention also defines an identity space. This is the range—the reference signal (vector) coordinates value range in the case of a reference signal vector, and the reference signal matrix coordinate value range in the case of a reference signal matrix—which permits a unique assignment of each individual input signal coordinate (of an input signal vector, or else of an input signal matrix) to the associated reference signal coordinate. In addition, it is also possible to determine a safety space which, so to speak, detects input a signal coordinates which cannot be uniquely assigned. This is explained in more detail with reference to the description of the figures.

The complete coincidence of the input signal vector with the reference signal vector (within the scope of the tolerances) is now determined when a prescribed number z, where $z \leq n$, of input signal coordinates are situated within the respectively associated reference signal coordinates value range. Consequently, a further variation can be undertaken in the grid in order to determine correspondences by selecting the number z, in addition to determining the above described interval deviations and the number of the characteristics taken into account. The larger the number z by comparison with the dimension of the vectors (n) to be compared, the nearer (acoustically) the vectors to be checked have to come to one another.

A control device connected to the input device is activated in the event of correspondence of the input signal vector with the reference signal vector. This can be a central operating device for a door, a gate, an elevator etc. for the purpose of access control. Driving a machine as a whole is also conceivable. Of course, individual functions of an overall system can also be controlled in this way.

A device operating in accordance with the method according to the invention is the subject matter of patent claim 10. It is of particular importance within the scope of the invention that the comparison of the acoustic input signal fed in with one (or more) acoustic reference signals stored in the memory is performed in a way which is particularly simple, fast and efficient. In essence, this is achieved by dispensing completely with the detailed evaluation and the comparison of temporal amplitude characteristics, Fourier spectra or the like. Rather, the signal comparison is undertaken such that the signal sequences to be checked are transformed into the Fourier space, and the Fourier spectrum produced here is mapped onto an n-dimensional vector. In other words, the respective signal sequences are identified with n-dimensional vectors which permit a rapid and simple comparison with one another. The assignment of the Fourier spectrum to individual coordinates of the above-named n-dimensional vectors is performed in this case by means of the described filters in the frequency analyzer, while the comparison is carried out in an (n-dimensional) comparator. In any case, the Fourier spectrum can ideally be reduced to a sequence of (binary) data (or also analog values), which permit a simple, reliable and rapid comparison with one another. Moreover, the device can have a learning configuration by virtue of the fact that the reference signal or signals stored in the memory is/are updated in specific cycles. This is where the essential advantages of the invention are to be seen. All the above-described devices can, of course, be combined to form an overall system, for example a computer system.

BRIEF DESCRIPTION OF THE DRAWINGS

Other objects and features of the present invention will become apparent from the following detailed description considered in connection with the accompanying drawing which discloses two embodiments of the present invention. It should be understood, however, that the drawing is designed for the purpose of illustration only and not as a definition of the limits of the invention.

In the drawing, wherein similar reference characters denote similar elements throughout the several views:

FIG. 2 shows a Fourier spectrum, and

FIG. 3 shows the amplitude-time characteristic corresponding to FIG. 2.

DETAILED DESCRIPTION OF PREFERRED EMBODIMENTS

Figure 1:
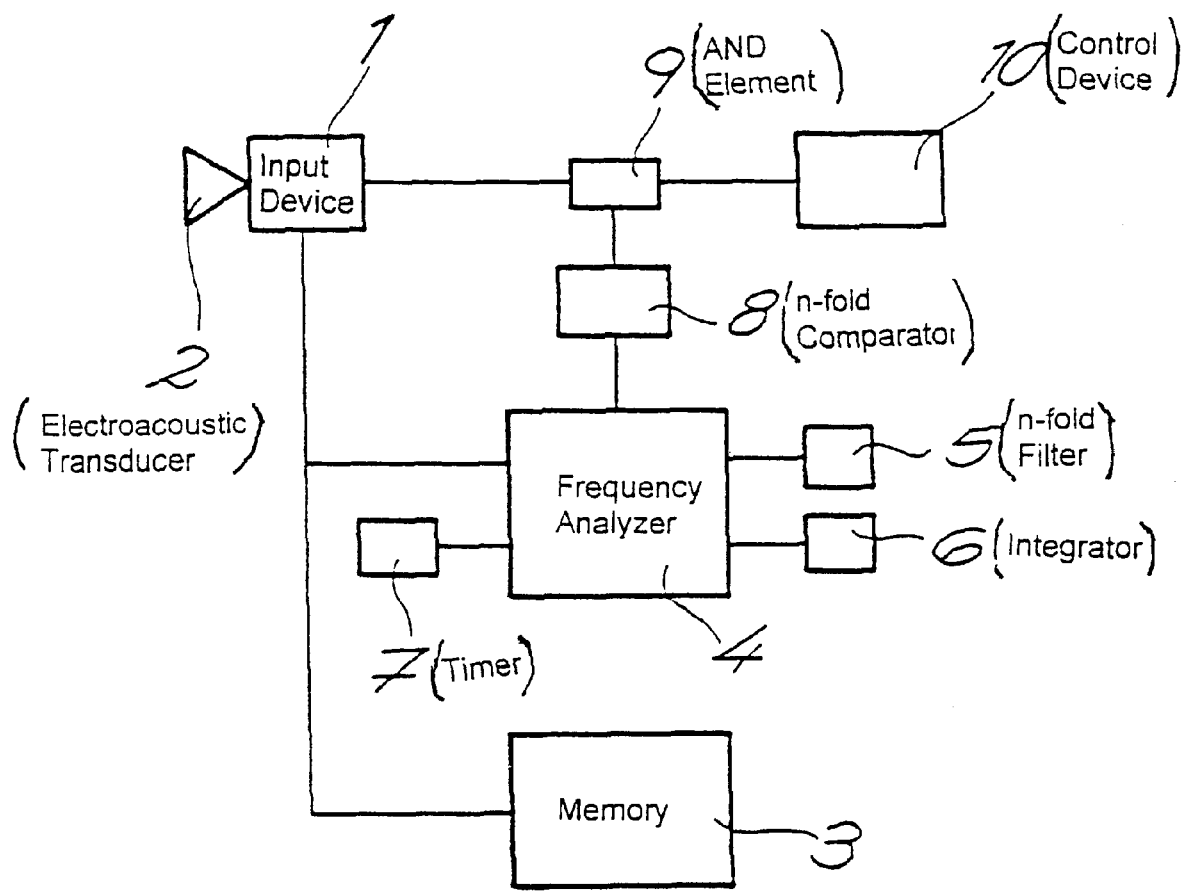
FIG. 1 shows a device according to the invention in a diagrammatic view.
Figure 4:
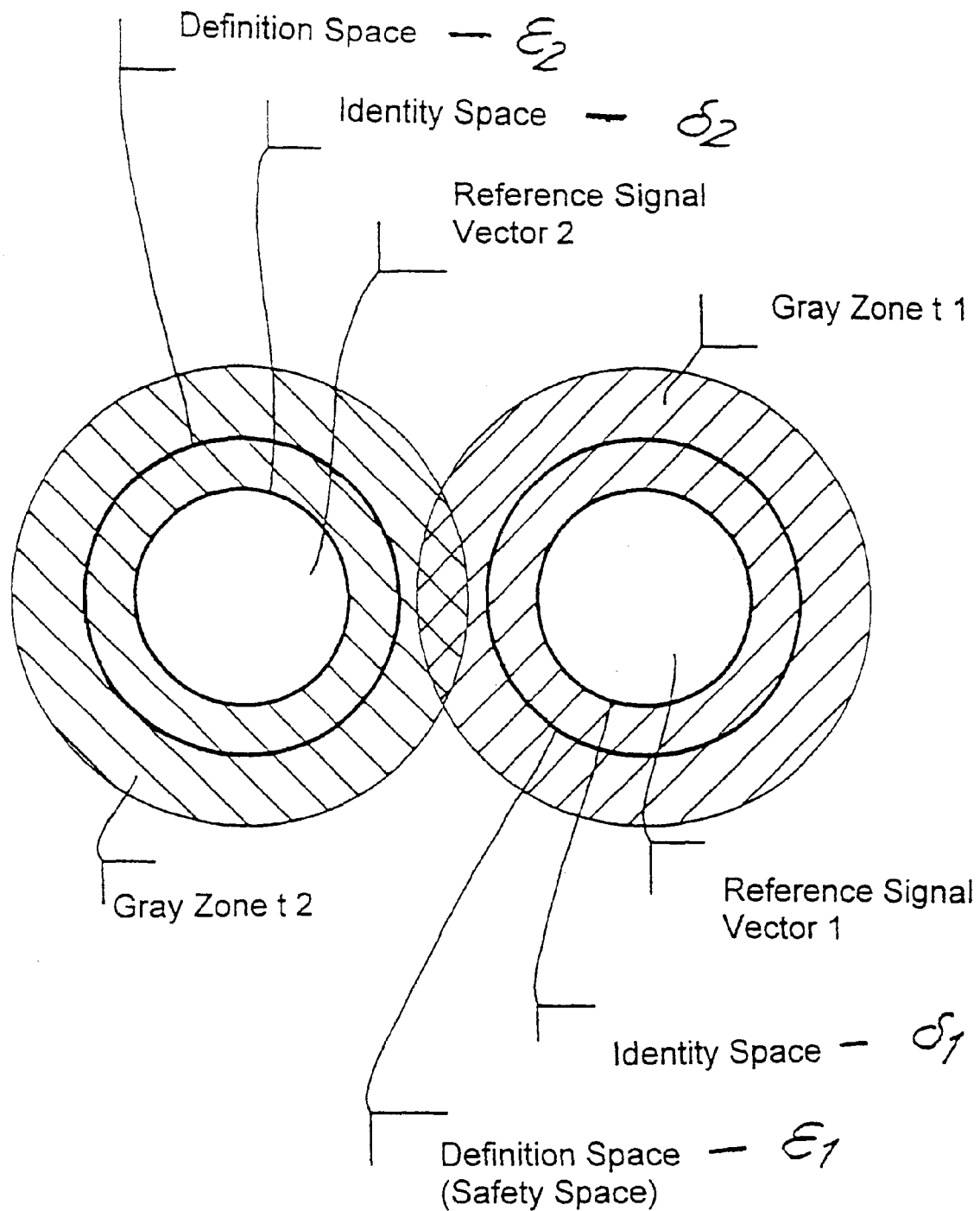
FIG. 4 shows the relations between the definition spaces, reference signal vectors, identity spaces and gray zones with respect to different vectors.

The figures show a device for comparing acoustic (input) signals fed into an input device (1) with reference signals. The conversion of these acoustic signals into electric value pairs (amplitude and time) is performed via an electro-acoustic transducer 2, in the simplest case a microphone 2. The above-named input device 1 is connected to a memory 3. A frequency analyzer 4 is connected to the input device 1 and the memory 3.

An n-fold filter 5, an integrator 6 and a timer 7 are connected to this frequency analyzer 4 in accordance with the exemplary embodiment. On the output side, the frequency analyzer 4 is connected via an n-fold comparator 8 to an AND element 9 which permits the control device 10 downstream thereof to be driven only whenever the comparator 8 determines a correspondence between the input signal and reference signal, and there is an input signal present at the input device 1 in any case. Only then is the control device 10 appropriately actuated. This can be a (central) operating device for a door, a gate or the like for the purpose of access control. Of course, it is also conceivable to drive a machine. In this connection, it is also conceivable to drive a machine. In this connection, it is also possible to execute individual—differentiated—commands on the part of the machine, specifically as a function of the reference signal which, in the final analysis, has been selected through comparison by means of the input signal. Depending on the reference signal transmitted to the control device 10, different operating states of, for example, a connected machine or system can be represented with the aid of the control device 10.

The mode of operation of the device represented is as follows. In order to produce reference signal vectors stored in the memory 3, the first step is to evaluate reference signals via the input device 1 with the aid of the frequency analyzer 4 in the course of harmonic analysis of these signals. A time-dependent Fourier spectrum is produced for this purpose. Preselectable characteristics of this Fourier spectrum now serve to define individual reference coordinates of the n-dimensional reference signal vector to be defined. These preselectable characteristics of the Fourier spectrum can be the highest frequency $f_{max}$ (compare FIG. 2). It is further conceivable to have recourse to the maximum amplitude $a_{max}$. The duration of the signal $t_{max}$ can be detected by means of the timer or time filter 7. Moreover, relative gains can be used to define the n-dimensional reference signal vector. In this case, recourse may be made to a fundamental with the frequency $f_0$ and to associated harmonics with the frequencies $2f_0$. The associated amplitudes $a_1$, $a_2$ and $a_3$ can be set into the ratios: $a_1:a_2$; $a_1:a_3$ and $a_2:a_3$.

In addition, it is possible as a special feature of the Fourier spectrum (song spectrum) represented in FIG. 2 to have recourse to the nine maxima ("peaks above $a_3$") to be detected there. Finally, the surface indicated by hatching below the curve can be determined by integrating the amplitude a cover the frequency f. This can be performed in the integrator 6, while the abovementioned characteristics are obtained by means of the filter 5 from the Fourier spectrum represented, as has already been described. The dimension n of the reference signal vector and input signal vector can be determined, inter alia, with the aid of the time filter 7.

In any case, the input signal vector, which is six-dimensional (n=6) according to the exemplary embodiment, can be represented in principle as follows:

$$\begin{pmatrix} f_{e\ max} \\ a_{e\ max} \\ t_{e\ max} \\ a_{1e}:a_{2e} \\ a_{1e}:a_{3e} \\ a_{2e}:a_{3e} \end{pmatrix}$$

where $f_{emax}$, $a_{emax}$, $t_{emax}$ are the maximum frequency, amplitude and period of the input signal vector (e=input signal). $a_{1e}$, $a_{2e}$, $a_{3e}$ denote selected amplitude values. The reference signal vector r=reference signal) is therefore as follows:

$$\begin{pmatrix} f_{r\,max} \\ a_{r\,max} \\ t_{r\,max} \\ a_{1r}:a_{2r} \\ a_{1r}:a_{3r} \\ a_{2r}:a_{3r} \end{pmatrix}$$

The result is that both the input signal vector and reference signal vector are produced with the aid of the method represented. The at least one reference signal vector is stored in the memory 3 after being determined, and checked with the aid of the input signal vector for the correspondence of respectively corresponding coordinates within prescribed tolerances. In other words, the respective coordinate values $f_{max}$, $a_{max}$, $t_{max}$ etc. of the input signal vector, on the one hand, and reference signal vector, on the other hand, are compared. As soon as a correspondence has been determined in the comparator 8 within prescribed tolerances, the comparator 8 is correspondingly applied to the AND element 9 so that the reference signal vector can be transmitted to the control device 10 and leads here, for example to execution of the desired command.

The procedure when defining the reference signal vector is such that a specific reference signal is repeatedly subjected to a multiple harmonic analysis of this vector, the individual signal vectors produced thereby being arithmetically averaged to determine the reference signal vector. Consequently, with regard to the individual coordinates a plurality of highest frequencies $f_{1max}$, $f_{2max}$ etc. are, so to speak, detected and averaged arithmetically as follows:

$$\overline{f_{max}} = \frac{1}{l} \sum_{l=1}^{l} f_{1\,max}$$

This is repeated for each coordinate until the reference signal vector has been defined in this way as an arithmetic mean.

Depending on the number of the reference signal vectors to be stored, the latter can be flanked by a definition vector $\epsilon$. With the aid of this definition vector (or one-dimensional definition space) $\epsilon$, it is possible to interpret signal vectors within the prescribed bandwidth $\epsilon$ as being equal or identical, even when large tonal or voice deviations are to be noted in part. Consequently, the definition space can also be denoted as a safety space. This depends finally on the number of the reference signal vectors and also on how many coordinates are to be used in processing.

If, for example, recourse is to be made to only two reference signal vectors, the contents of the memory 3 can be represented as follows:

$$\begin{pmatrix} f^1_{r\,max} & \pm\varepsilon_1 \\ a^1_{r\,max} & \pm\varepsilon_2 \\ t^1_{r\,max} & \pm\varepsilon_3 \\ (a^1_{1r}:a^1_{2r}) & \pm\varepsilon_4 \\ (a^1_{1r}:a^1_{3r}) & \pm\varepsilon_5 \\ (a^1_{2r}:a^1_{3r}) & \pm\varepsilon_6 \end{pmatrix} \begin{pmatrix} f^2_{r\,max} & \pm\varepsilon_1 \\ a^2_{r\,max} & \pm\varepsilon_2 \\ t^2_{r\,max} & \pm\varepsilon_3 \\ (a^2_{1r}:a^2_{2r}) & \pm\varepsilon_4 \\ (a^2_{1r}:a^2_{3r}) & \pm\varepsilon_5 \\ (a^2_{2r}:a^2_{3r}) & \pm\varepsilon_6 \end{pmatrix}$$

where $f^1_{rmax}$, $f^2_{rmax}$ etc. are the coordinates of the first and second reference signal vectors, and $$(f^1_{rmax} \pm \epsilon_1) \cap (f^2_{rmax} \pm \epsilon_1) = \emptyset,$$

that is to say, the two reference signal vectors, including the definition space $\epsilon$, have no overlap.

In the present case, the "spacing" is respectively formed with the same value of virtually $2\epsilon$, $$\varepsilon = \begin{pmatrix} \varepsilon_1 \\ \varepsilon_2 \\ \varepsilon_3 \\ \varepsilon_4 \\ \varepsilon_5 \\ \varepsilon_6 \end{pmatrix}$$

where although, of course, different valences are also conceivable. Consequently, an input signal vector (after determination of the first reference signal vector) is used to define the current second reference signal vector only whenever it is outside $f^1_{rmax} \pm \epsilon_1$ etc.

Overall, it is possible to store a preselectable number m of reference signal vectors with in each case n reference (signal) coordinates in the memory 3 by forming an m×n reference signal matrix. The adjustable tolerance takes the form of prescribed interval deviations $\delta_1$, $\delta_2$, $\delta_3$ . . . of a respective coordinate of the reference signal vector. It is possible in this way to form respectively corresponding reference signal coordinates value ranges, for example $f_{max} \pm \delta_1$, $a_{max} \pm \delta_2$, $t_{max} \pm \delta_3$ etc.

The relative position of each input coordinate compared with the associated reference signal coordinate value range is determined in order to check the correspondence of an input signal vector fed in and the reference signal vector stored in the memory 3. In plain words, the six-dimensional reference signal vector with the individual reference signal coordinates value ranges appears as follows:

$$\begin{pmatrix} f_{r\,max} & \pm\delta_1 \\ a_{r\,max} & \pm\delta_2 \\ t_{r\,max} & \pm\delta_3 \\ (a_{1r}:a_{2r}) & \pm\delta_4 \\ (a_{1r}:a_{3r}) & \pm\delta_5 \\ (a_{2r}:a_{3r}) & \pm\delta_6 \end{pmatrix}$$

The associated vector represents a (one-dimensional) identity space $\delta$.

$$\delta = \begin{pmatrix} \delta_1 \\ \delta_2 \\ \delta_3 \\ \delta_4 \\ \delta_5 \\ \delta_6 \end{pmatrix}$$

In general, the previously determined (one-dimensional) definition space $\epsilon$ will be chosen to be greater than or equal to the identity space $\delta$ which is independent thereof, in principle, that is to say $\delta \leq \epsilon$. Consequently, if an input signal vector is within the range spanned by the reference signal vector plus/minus definition or identity space $\epsilon$, $\delta$, the input signal vector will be identified as equal to the reference signal vector, and the desired command will be carried out.

Moreover, it is possible to define a (one-dimensional) option space as follows:

$$s = \delta + t$$

where with $$s = \begin{pmatrix} \delta_1 + t_1 \\ \delta_2 + t_2 \\ \delta_3 + t_3 \\ \delta_4 + t_4 \\ \delta_5 + t_5 \\ \delta_6 + t_6 \end{pmatrix}$$

the result that the reference signal coordinates value range can be written as fallows with the identity and option spaces:

$$\begin{pmatrix} f_{r\,max} & \pm & (\delta_1 + t_1) \\ a_{r\,max} & \pm & (\delta_2 + t_2) \\ t_{r\,max} & \pm & (\delta_3 + t_3) \\ (a_{1r}:a_{2r}) & \pm & (\delta_4 + t_4) \\ (a_{1r}:a_{3r}) & \pm & (\delta_5 + t_5) \\ (a_{2r}:a_{3r}) & \pm & (\delta_6 + t_6) \end{pmatrix}$$

The comparison of each input (sign) coordinate with the corresponding reference (signal) coordinate value range therefore amounts to deciding whether this input signal coordinate is within the interval defined by the reference signal coordinates value range:

$$f_{emax} \in [f_{rmax} - \delta_1; f_{rmax} + \delta_1]?$$

Of course, the procedure must be comparable for the other coordinates as well. If the associated balance condition has been affirmed, it is possible to maintain that the input (signal) coordinate corresponds to the reference (signal) coordinate (within the identity or safety space $\delta$, $\epsilon$). For the case in which the above-named condition is negated, but the interrogation $$f_{emax} \in [f_{rmax} - (\delta_1 + t_1); f_{rmax} + (\delta_1 + t_1)]$$

is affirmed, the input signal coordinate femax to be investigated is, so to speak, in the option space s, but not in the identity space $\delta$. Depending on the configuration of the method, such a result can be evaluated as correspondence or a faulty comparison. In any case, the described method thereby acquires additional hit accuracy, because there is an additive definition of a type of gray zone t which is added to the identity space $\delta$. This gray zone t can be set up, furthermore, such that the following hold:

$$(f^1_{rmax} \pm \delta_1) \cap (f^2_{rmax} \pm \delta_1) = \emptyset$$

and $$(f^1_{rmax} \pm (\delta_1 + t_1)) \cap (f^2_{rmax} \pm (\delta_2 + t_1)) \neq \emptyset$$

that is to say, one input signal vector can be assigned to two (or more) reference signal vectors within the gray zone t—and only therein. This is generally not desirable, but can have advantages in specific applications. Of course, the identity space and definition space/safety space $\delta$, $\epsilon$ can be of variable configuration, with the result that the device represented is capable of learning and can, for example, be adapted to different operators.

As soon as a prescribed number z, where $z \leq n$, of input coordinates is within the respectively associated reference signal coordinates value range, the correspondence of the input signal vector with the reference signal vector is determined.

Thus, in summary, the procedure is that the interrogation previously set forth is repeated for each individual coordinate. This interrogation is identified either by "Y" or "N", depending on the result (Y=Yes or N=No). The number V of "Y" detected is now determined and compared with the prescribed number z. For the case in which it holds that $V \leq z$, the desired correspondence is not obtained. By contrast therewith, V>z finally initiates the transmission of the reference signal vector from the comparator 8 via the AND element 9 to the control device 10.

On the basis of the above considerations, the number V (of "Y" detected) can be enlarged by the valency number g in the option space s or the gray zone t, so that it is necessary to decide the interrogation $V+g \leq z$ or V+g>z for this case.

An input and interrogation mode will now be explained in detail—starting from an empty memory 3. For the purpose of determining the reference signal vectors to be stored, it is necessary as a first step to specify their number and the associated definition or safety space $\epsilon$. Generally, for this purpose the procedure is that for each coordinate of the reference signal vector the available memory contents are subdivided into, so to speak, equidistant areas—depending on the number of reference signal vectors. In detail, the first reference signal vector can denote "apple", for example, and contain a definition or safety space $\epsilon$ in accordance with the above-named rule. Of course, this space can also be externally prescribed. Following hereupon, it is conceivable for the above-named term to be multiply repeated and for the already described arithmetic averaging to be undertaken.

If a second word is now input to define a further reference signal vector, for example "fork", its entry in the memory 3 depends on whether the safety space relevant to "fork" intersects the definition or safety space $\epsilon$ of "apple". If this is the case, "fork" is not admitted, with the result that it is necessary to dispense with this, or the safety spaces are to be adapted correspondingly i.e., they must be regularly reduced. This then naturally bears on the selection. In any case, it is clear that the safety or definition space $\epsilon$ can either be permanently prescribed, or can be adapted to the circumstances, in particular the number of reference signal vectors to be stored. A so to speak experimental determination of the above-named space $\epsilon$ can be performed in this connection.

The reference signal vectors are thereby determined with their safety or definition space $\epsilon$. The comparison between the reference signal vector and input signal vector is performed entirely independently thereof. For this purpose, the first step is to determine the respectively associated identity space $\delta$, which is at most as large as the definition space $\epsilon$ already addressed previously. As soon as an input signal vector is present in the existing identity space of a reference signal vector, this is interpreted as identity, and the command identified in such a way is executed. The input signal vector is not detected outside the respective identity space $\delta$. It should be stressed that it is self-evident in this connection that it is not only an input signal vector "apple" which effects the initiation of the chain of commands relevant to the reference signal vector "apple". Rather, it is also conceivable in principle that a word such as "dachshund" can be within the identity space $\delta$ relating to "apple", with the result that even the input "dachshund" initiates the same command as "apple".

For the case in which—as already described—the input signal vector is not resident in any identity space $\delta$ of the reference signal vectors stored in the memory 3, the invention has recourse, if appropriate, to the option space s. The latter surrounds the identity space $\delta$, so to speak, with its gray zone 5, and detects exactly such input signal vectors. In this case, the option space s can be smaller than the definition or safety space $\epsilon$. It holds, in general, that S>$\epsilon$.

Depending on the configuration of the method, it is now possible either to provide an error message, that is to say the input signal vector is not detected as a command input, or an optical display is carried out in such a way that the operator is asked whether the reference signal vector corresponding to the option space s is intended. It is conceivable in this connection that two or more reference signal vectors are also available for selection. In any case, instead of a rejection of this input, recourse to the option space s can open up the possibility of correcting this input or defining it more precisely.

(As for the definition or safety space $\epsilon$ and, of course, also for the option space s) it also holds for the identity space $\delta$ that the size thereof is either prescribed externally or can be determined with the aid of experiments. In any case, the option space s serves, so to speak, as a collecting network for input signal vectors which cannot be assigned to any identity space $\delta$ of a reference signal vector. The fact that overlaps are even tolerated in some circumstances in this regard, that is to say the option spaces of individual reference signal vectors have an overlap and are therefore larger than the associated safety or definition spaces $\epsilon$, is not a problem if the further interrogation can be built in before the execution of the desired command. Of course, if absolute foolproofness is desired the option space s will generally be dispensed with entirely.

Accordingly, while a few embodiments of the present invention have been shown and described, it is to be understood that many changes and modifications may be made thereunto without departing from the spirit and scope of the invention as defined in the appended claims.

What is claimed is:

1. A method for comparing at least one acoustic input signal fed into an input device with at least one further acoustic reference signal stored in a memory said method comprising the steps of:

carrying out a harmonic analysis of the input signal to produce a Fourier spectrum in a frequency analyzer connected to the input device and the memory;

using the Fourier spectrum to define an n-dimensional input signal vector with n input (signal) coordinates;

checking the input signal vector for correspondence with at least one reference signal vector, which is defined in the same way and stored in the memory, wherein;

the respective reference signal vector is flanked by a safety space or definition space ($\epsilon$), preferably adapted to the number of the reference signal vectors to be stored, and by an identity space ($\delta$; where $\delta \leq \epsilon$);

the input signal vector is identified as being equal to the reference signal vector at least whenever it is situated inside the identity space ($\delta$), respective reference signal vectors including the definition space ($\epsilon$) have no overlap, and the definition or safety spaces ($\epsilon$) of the reference signal vectors do not overlap one another.

2. The method of claim 1, wherein the input signal vector to be compared with the reference signal vector is not detected outside the respective identity space ($\delta$).

3. The method of claim 1, further comprising at least one option space defined which surrounds the identity space ($\delta$) with a gray zone (t) and facilitates as a collecting net for input signal vectors which cannot be assigned to an identity space ($\delta$) of a reference signal vector.

4. A method for comparing at least one acoustic input signal fed into an input device with at least one further acoustic reference signal stored in a memory, said method comprising the steps of:

carrying out a harmonic analysis of the input signal to produce a Fourier spectrum in a frequency analyzer connected to the input device and the memory;

using the Fourier spectrum to define an n-dimensional input signal vector with n input (signal) coordinates;

checking the input signal vector for correspondence with at least one reference signal vector, which is defined in the same way and stored in the memory; and using an adjustable n-fold filter to evaluate preselectable characteristics of the Fourier spectrum in the frequency analyzer and to convert same into the n input (signal) coordinates of the input signal vector.

5. The method as claimed in claim 4, wherein the preselectable characteristics comprise a highest frequency, a maximum amplitude, a duration, or a relative gains of salient frequencies.

6. The method of claim 4, wherein the characteristics of the Fourier spectrum are converted into the corresponding values for the input coordinates of the input signal vector or reference coordinates of the reference signal vector by integrators summed over the time constant.

7. The method as claimed in claim 4, wherein respectively corresponding coordinates of the input signal vector and the reference signal vector are checked for correspondence within prescribed tolerances.

8. The method as claimed in claims 7, wherein the tolerances are formed as prescribed interval deviations of a respective reference coordinate of the reference signal vector by determining a corresponding reference signal coordinates value range, and wherein the relative position of each input coordinate is determined by comparison with the associated reference signal coordinates value range in order to check the correspondence of the input signal vector and reference signal vector.

9. The method as claimed in claim 8, wherein the correspondence of the input signal vector with the reference signal vector is determined when a prescribed number (z, where $z \leq n$) of input coordinates are situated within the respectively associated reference signal coordinates value range.

10. The method as claimed in claim 4, wherein the Fourier spectrum is recorded with a time constant adapted to a maximum length ($t_{max}$) of the input signal.

11. The method as claimed in claim 4, wherein in order to define the reference signal vector a specific reference signal is repeatedly subjected to multiple harmonic analysis for defining a signal vector, and the individual signal vectors are averaged arithmetically in order to determine the reference signal vector.

12. The method as claimed in claim 4, wherein a preselectable number (m) of reference signal vectors within n reference coordinates are stored in the memory (3) by forming an m×n reference signal matrix.

13. The method as claimed in claims 4, wherein a control device connected to the input device is activated in the event of correspondence of the input signal vector with the reference signal vector.

14. A device for comparing at least one acoustic input signal fed into an input device with at least one further acoustic reference signal stored in a memory, in particular for carrying out the method as claimed in claims 4, having a frequency analyzer connected to the input device and the memory, and having a comparator connected on the output side to the frequency analyzer, wherein the frequency analyzer is assigned an adjustable n-fold filter and integrators, wherein, moreover there is an AND element downstream of the comparator, and wherein the n input coordinates of the input signal vector and the n reference coordinates of the reference signal vector are produces with the aid of the adjustable n-fold filter and are compared with one another, in which case a control device (10) connected to the AND element (8) is activated as a function of the correspondence between the input signal vector and reference signal vector.

* * * * *